Oct. 30, 1934.  J. H. JENSEN  1,978,843
TROLLING SPOON
Filed July 29, 1931
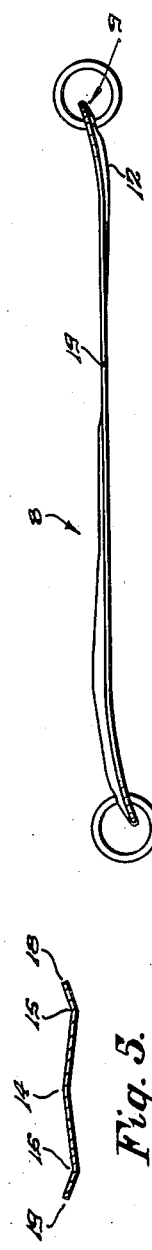
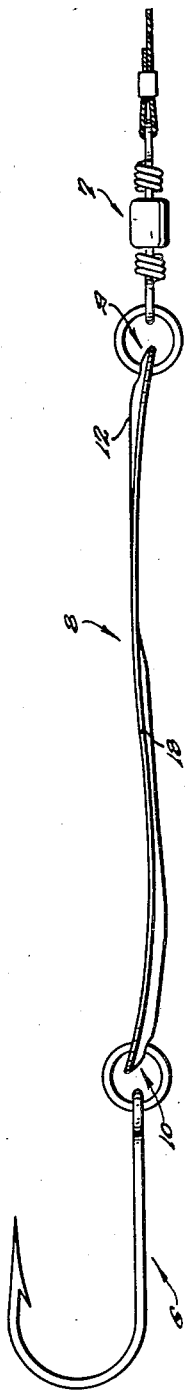
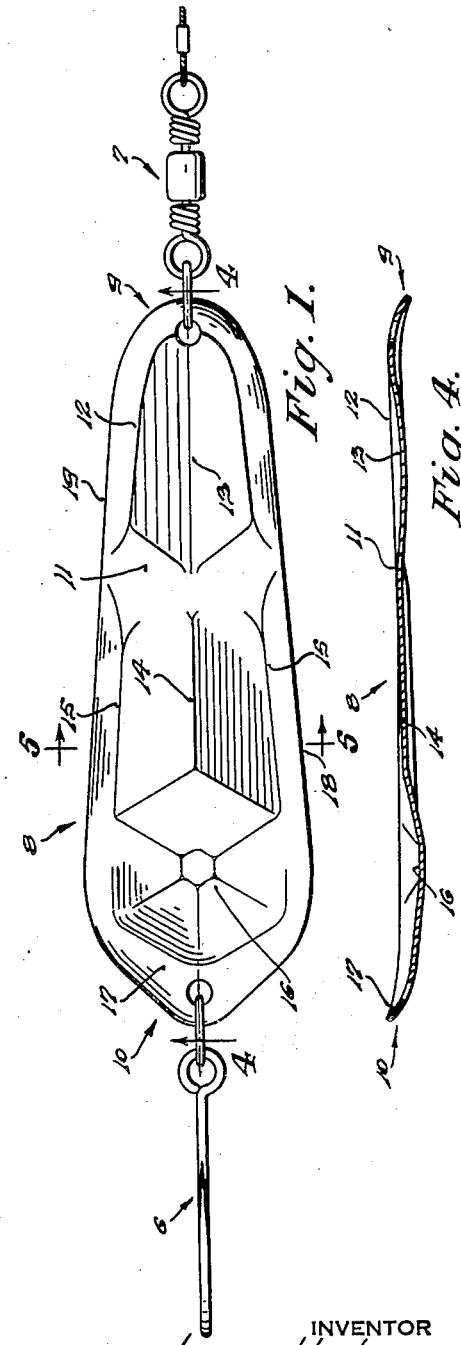
INVENTOR
Jens H. Jensen
BY
Edward E. Barnes
ATTORNEY Patented Oct. 30, 1934

1,978,843

UNITED STATES PATENT OFFICE 1,978,843

TROLLING SPOON

Jens H. Jensen, Seattle, Wash.

Application July 29, 1931, Serial No. 553,706

9 Claims. (Cl. 43—45)

This invention relates to improvements in trolling spoons of that character commonly employed in fishing for salmon, trout, and other game fish, the primary object of the invention being the provision of a spoon which, when drawn through the water, will more efficiently attract the game fish by reason of a novel formation affording a rolling action especially attractive as a lure to the fish.

A further and particular object is the provision of a spoon formed such as to provide more effective variance in the surface angularities than heretofore, increasing rigidity to maintain the shape and assuring repetitive flashing irrespective of the position of the spoon in the water.

A still further object is the provision of a spoon wherein the rear terminal of the same is bounded rectilinearly in assuring a spilling of the water over the same at an angle to the major axis of the spoon.

In the drawing,—

Figure 1 is a plan view of an embodiment of my invention.

Figs. 2 and 3 are views taken to the opposite edges of the invention.

Fig. 4 is a longitudinal section taken on the line 4—4 of Fig. 1; and

Fig. 5 is a transverse section on line 5—5 of Fig. 1.

In the drawing, I represent by the numeral 6 a hook which is connected by a ring or the like with the spoon, said spoon being indicated generally by 8. At the opposite or leading end of the spoon, a similar ring receives a conventional swivel 7 by means of which the spoon is attached to a fishing line.

The spoon, which constitutes the subject of the present invention, is formed from sheet metal or other like or suitable material to an elongated ovular configuration somewhat along the general plan development of the McMahon spoon illustrated and described in Patent No. 1,136,475, issued April 20, 1915. In its general form, however, the spoon is distinguished from the McMahon design in that the leading and rear edges 9, 10, respectively, present somewhat of an angular appearance in plan rather than arcuate and provides a rear end which is materially wider than the front end. The body proper of the spoon, further, is formed to provide a plurality of longitudinally extending ridges and gullies located in laterally spaced dispositions, the surface between each ridge and an adjacent gully producing an inclined reflection face.

More especially as regards said reflection surfaces, each of the same are interrupted in relative proximity of the midlength of the spoon to render the direction of reflection of an inclined face converse as regards the direction of reflection from another face longitudinally aligned therewith. In producing such converse reflection, I form the spoon such that the line of projection of each of the gullies and the ridges is directed toward the plane of the spoon and intersects the same at the approximate midlength thereof to provide, at one side of the intersection, a ridge, and at the other side of the intersection, a gully. The transverse line on which each of the lines of projection intersects the plane of the spoon is slightly forward of the spoon's minor axis and at such point produces a plane surface 11.

Such lines of projection I locate preferably on the longitudinal or major axis of the spoon and at opposite sides of the major axis, the ridge and gully produced on such major axis being respectively indicated by 14, 13 and the ridges and gullies at each side thereof being respectively indicated by 12 and 15. Said ridges and gullies 12, 15 each extend parallel or approximately so with the lateral edges 18, 19 of the spoon and desirably are located in closer proximity of the edges than to the spoon's major axis with the angle of inclination of the face which lies between the same and the lateral edges greater than the angle of inclination therebetween and the major axis.

Said ridge 14 and the gullies 15 at each side of the same terminate at their rearmost points approximately midway between the plane surface 11 and the inclined rear end of the spoon, the portion of the spoon lying between said ridge terminus and the rear end of the spoon being pressed downwardly to produce a cup-shaped cavity 16 from which the walls rise in a slight elevation for a short distance with the pitch increasing at the rear end to terminate in a sharply inclined lip 17. The side walls of said cavity similarly extend in an increasing pitch to the lateral edges of the spoon. In elevation, said edge 19 is preferably formed rectilinear between the inclined front and rear ends of the spoon while edge 18 is curvilinear and of a sinusoidal character.

In operation, the rear end of the spoon tends to drop slightly below the leading end and the direction of movement of the spoon initially is toward the direction of inclination of the front end, the consequent positioning of the spoon oblique to the direction of travel exposing the cavity 16 and the lip 17 to the force of the water streaming past the same. A cyclical reversal responsive to a re-active kick-back from the impinging water is imparted to the spoon. Simultaneously with such action, the curvilinear edge throws the spoon out of vertical balance to cause an eccentric heeling-over as the water spills over the respective lip edges. The multiple flashing surfaces afforded by the arrangement of the gullies and ridges, together with the eccentricity of the reactionary forces obtained on the spoon, afford a most effective compounding of habitual movements common to the smaller fish upon which the objective game-fish feed.

The invention is believed clear from the foregoing. However, while the preferred disclosure most efficiently serves those objectives desired in the construction of a most advantageous trolling spoon, it is not my intention to particularly confine the invention except as may be limited by the scope of the hereto annexed claims.

What I claim, is,—

1. A trolling spoon having its front and rear edges inclined from opposite sides of the spoon and with the body proper between said inclined portions formed to present a plurality of laterally spaced apart ridges and gullies, said spoon at its approximate midlength providing a plane portion interrupting the ridges and gullies, each of said ridges and gullies being disposed on lines approximately parallel with the major axis of the spoon and formed to have each of the gullies at one side of the plane portion longitudinally aligned with a ridge at the other side of the plane portion.

2. The structure as defined in claim 1, and a cup-shaped cavity formed in the rear portion of the spoon between the ridges and gullies thereof and the inclined end.

3. A trolling spoon having its front and rear ends inclined in opposite directions from the plane of the spoon and with the rear portion immediately forward of the inclined end pressed out to form a cup-shaped cavity, said spoon at its approximate midlength providing a plane portion and therebetween and the cup-shaped cavity providing a plurality of laterally spaced apart ridges and gullies, the spoon between said plane portion and the forward inclined end providing a plurality of laterally spaced apart ridges and gullies, each ridge of which is longitudinally aligned with a gully at the opposite side of the plane portion and each gully of which is longitudinally aligned with a ridge at the opposite side of the plane portion.

4. A trolling spoon having its front and rear edges inclined in opposite directions from the plane of the spoon and formed at its approximate midlength with a plane portion extending transversely of the spoon, said spoon immediately adjacent said plane portion and from opposite sides of the same being provided with longitudinally extending laterally spaced apart ridges and gullies, the lines of longitudinal projection of said gullies and ridges being approximately parallel with the major axis of the spoon and the side walls of said ridges and gullies providing variable angles of reflection to light rays striking the same.

5. A trolling spoon having its leading and rear edges inclined from opposite faces of the spoon, the rear portion of the spoon immediately forward of said inclined rear edge being pressed out to form a cup-shaped cavity, the material forwardly of said cavity being pressed into a plurality of extended ridges and gullies, each of which are projected approximately parallel with the major axis of the spoon, the side edges of the spoon being inclined to form lateral reaction surfaces.

6. A trolling spoon having its two opposite ends inclined in opposite directions from the plane of the spoon with the rear portion immediately forward of said inclined rear end being pressed out to form a cup-shaped cavity, the lateral edge along one side of the body proper of the spoon between the inclined end portions of the spoon being curvilinear in edge elevation and the edge along the other side of the body proper of the spoon between the inclined end portions being rectilinear in edge elevation.

7. A trolling spoon having its two opposite ends inclined in opposite directions from the plane of the spoon with the rear portion immediately forward of said inclined rear end being pressed out to form a cup-shaped cavity, substantially the entire body portion of the spoon between said cup-shaped cavity and the forward inclined end being pressed into plural longitudinally extending ridges and gullies with each side edge of the spoon having an inclined reaction surface.

8. A trolling spoon having its two opposite ends inclined in opposite directions from the plane of the spoon with substantially the entire body portion between said inclined ends pressed to form a plurality of longitudinally extending laterally spaced apart ridges and gullies, the lines of projection of said ridges and gullies being approximately parallel with the major axis of the spoon, the side walls extending laterally from the ridges and the gullies having variable inclinations to impart variable angles of reflection to light rays striking the same.

9. A trolling spoon having its two opposite ends inclined in opposite directions from the plane of the spoon and formed to provide along each side edge of said body proper of the spoon inclined faces, said spoon being further provided in the body proper of the same between the inclined lateral faces with a plurality of longitudinally extending alternate ridges and gullies, the walls between each of said ridges and the adjacent gully having an inclination from the plane of the body proper less than the inclinations of said lateral faces to afford variable angles of reflection to light rays striking the same.

JENS H. JENSEN.